US012737400B2

(12) United States Patent
Gautam et al.

(10) Patent No.: US 12,737,400 B2
(45) Date of Patent: Sep. 15, 2026

(54) GENERATION OF EXECUTABLE PROCEDURE USING NATURAL LANGUAGE

(71) Applicant: SAP SE, Walldorf (DE)

(72) Inventors: Prashant Gautam, Bangalore (IN); Manna Routh, Bangalore (IN); Md Razak, Bangalore (IN)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 18/496,007

(22) Filed: Oct. 27, 2023

(65) Prior Publication Data

US 2025/0139539 A1 May 1, 2025

(51) Int. Cl.

| | |
|---|---|
| ***G06F 16/334*** | (2025.01) |
| ***G06F 8/10*** | (2018.01) |
| ***G06F 8/41*** | (2018.01) |
| ***G06F 16/34*** | (2025.01) |
| ***G06F 40/30*** | (2020.01) |
| ***G06F 40/40*** | (2020.01) |

(Continued)

(52) U.S. Cl.

CPC ............ *G06F 16/3344* (2019.01); *G06F 8/10* (2013.01); *G06F 8/41* (2013.01); *G06F 8/447* (2013.01); *G06F 16/345* (2019.01); *G06F 40/30* (2020.01); *G06F 40/40* (2020.01); *G06Q 10/06* (2013.01); *G06Q 10/0633* (2013.01)

(58) Field of Classification Search

CPC .......................... G06Q 10/06; G06Q 10/0633; G06F 16/3344; G06F 16/345; G06F 40/20; G06F 40/30; G06F 40/40; G06F 8/10; G06F 8/41

See application file for complete search history.

(56) References Cited

U.S. PATENT DOCUMENTS

2023/0418815 A1* 12/2023 Zorn .......................... G06F 8/10
2024/0362209 A1* 10/2024 Almaer ................. G06F 16/245

(Continued)

FOREIGN PATENT DOCUMENTS

EP 4283546 A1 * 11/2023 ........... G06Q 10/103

OTHER PUBLICATIONS

Goossens, Alexandre, et al., GPT-3 for Decision Logic Modeling, Proceedings for the 17th International Rule Challenge and 7th Doctoral Consortium @ RuleML+RR 2023, Sep. 2023, 15 pages, [retrieved on Sep. 13, 2025], Retrieved from the Internet: <URL: https://lirias.kuleuven.be/retrieve/720326>.*

(Continued)

*Primary Examiner* — Geoffrey R St Leger

(74) *Attorney, Agent, or Firm* — Buckley, Maschoff & Talwalkar LLC

(57) ABSTRACT

Systems and methods include input of a description of a procedure to a large language model to determine a domain of the description, determination of modifiers to the description based on the domain, determination of example procedure models and descriptions corresponding to the example procedure models based on the domain, generation of a procedure model prompt based on the description, the modifiers, the example procedure models and corresponding descriptions, provision of the procedure model prompt to the large language model, reception, in response to the prompt, of a generated procedure model from the large language model, and storage of the generated procedure model for execution by a workflow automation system.

19 Claims, 11 Drawing Sheets

(51) Int. Cl.
*G06Q 10/06* (2023.01)
*G06Q 10/0633* (2023.01)

(56) References Cited

U.S. PATENT DOCUMENTS

| | | | | |
|---|---|---|---|---|
| 2024/0379100 | A1* | 11/2024 | Shivani | G10L 15/22 |
| 2025/0029039 | A1* | 1/2025 | Kumar | G06Q 10/0633 |
| 2025/0045026 | A1* | 2/2025 | Ngiam | G06F 8/35 |
| 2025/0077559 | A1* | 3/2025 | Karri | G06T 11/206 |

OTHER PUBLICATIONS

Desmond, Michael, et al., A No Code Low-Code Paradigm for Authoring Business Automations Using Natural Language, arXiv preprint, Jul. 2022, 8 pages, [retrieved on Sep. 13, 2025], Retrieved from the Internet: <URL:https://arxiv.org/pdf/2207.10648>.*

Wu, Tongshuang et al., "PromptChainer: Chaining Large Language Model Prompts through Visual Programming", CHI '22 Extended Abstracts, Apr. 29-May 5, 2022, New Orleans, LA, USA, ACM ISBN 978-1-4503-9156-6/22/04, https://doi.org/10.1145/3491101.5319729, arXiv:2203.06566v1 [cs.HC], Mar. 13, 2022, 10pgs.

Cavanell, Zachary "Build Power Apps from a drawing & Power Automate Flows using natural language", downloaded from https:/// techcommunity.microsoft.com/...echanics-blog/build-power-apps-from-a-drawing-amp-power-automate-flows-using/ba-p/3648235, [Retrieved Oct. 26, 2023], published Oct. 12, 2022, 11pgs.

Wikipedia, the free encyclopedia, "Decision Model and Notation", Retrieved from https://en.wikipedia.org/w/index.php?title=Decision_Model_and_Notation&oldid=1150458635, Apr. 18, 2023. 6pgs.

"GitHub—red6/dmn-check: A tool which performs static analyses on Decision Model Notation (DMN) files to detect bugs", Issues 6, https://github.com/red6/dmn-check[Oct. 26, 2023 11:08:43 AM], 12pgs.

Gupta, Lokesh "How to Marshal and Unmarshal XML with Jackson", Aug. 21, 2022, https://howtodoinjava.com/jackson/jackson-XML-conversions/[Oct. 26, 2023 11:06:48 AM], 10pgs.

Shanmugham, Murali "Overview of Business Rules in Cloud Platform", SAP Blogs, May 2, 2017, https://blogs.sap.com/2017/05/02/overview-of-business-rules-in-cloud-platform/[Oct. 26, 2023 11:06:32 AM], 34pgs.

Wikipedia, the free encyclopedia, "Prompt engineering", https://en.wikipedia.org/w/index.php?title=Prompt_engineering&oldid=1181892711, Oct. 25, 2023, 16pgs.

Product documentation "Virtual Agent", Vancouver, https://docs.servicenow.com/bundle/vancouver-servicenow-platform/page/administer/virtual-agent/concept/virtual-agent-landing-page.html[Oct. 26, 2023 11:18:34 AM], Aug. 3, 2023, 3pgs.

* cited by examiner

GENERATION OF EXECUTABLE PROCEDURE USING NATURAL LANGUAGE

BACKGROUND

Modern organizations use computing systems for a multitude of tasks. Enterprise resource planning systems may be used to track, manage and troubleshoot most functional units of an organization, including but not limited to manufacturing and logistics, supply chain management, human resource management, customer relationship management, and finance. Systems of one organization may interact with systems of another organization, directly or through an intermediary, to streamline transactions between the organizations.

Organizations employ well-defined processes to achieve coherent, efficient, and reliable operation. It is often desirable to automate these processes using software-based automated workflow systems. Such "low-code" or "no code" systems allow non-technical users to design software-driven workflows and execute the workflows with little or no human intervention. Using these systems, a user defines a sequence of activities (i.e., a workflow) to be executed, the internal logic of each activity, and the data input to and output from each activity. A workflow may be executed, for example, to perform automatic processing of incoming and/or stored data, in response to a trigger or according to a defined temporal schedule.

An activity may include execution of a procedure which includes one or more decision steps governed by rules. Such a procedure will be referred to herein as an "executable procedure". Automated workflow systems require a user to express the logic of such procedures using a domain-specific expression language which can be executed by the systems. These languages may define the rules of a procedure using a decision table, an if-then-else rule or in any other suitable format. For example, conventional systems may require a user to create a new a procedure, define required data types, use the defined data types to configure inputs and outputs of the procedure and express the rules of the procedure in a decision table.

Generation of procedures for automated workflow system execution is tedious and error-prone, particularly for the novice user. Systems to generate executable procedures efficiently and with reduced development time and errors are desired.

DETAILED DESCRIPTION

The following description is provided to enable any person in the art to make and use the described embodiments. Various modifications, however, will be readily-apparent to those in the art.

Embodiments may provide efficient generation of procedures for execution by an automated workflow system. The executable procedures are generated based on natural language inputs from a user and on iterative interactions with a Large Language model (LLM). Briefly, a natural language description of a procedure comprising a decision is received, a domain of the procedure is received from an LLM, modifiers to the description are determined based on the domain, example natural language descriptions and corresponding procedure models are determined based on the domain, and the examples and modified description are used to obtain from the LLM a procedure model implementing the described decision(s).

Embodiments may therefore facilitate generation and use of executable procedures by non-technical users using natural language inputs. The users may further modify the generated executable procedures using similar natural languages inputs. Some embodiments also provide identification of gaps or oversights in a generated procedure and may further provide proposed modifications to the procedure to address the gaps.

Executable procedures according to some embodiments may comprise procedure models including data and executable code. In one example, a procedure model includes one or more decision tables to define rules, and code for evaluating the rules defined in a decision table. A procedure model may conform to the Decision Model and Notation (DMN) standard according to non-exhaustive embodiments.

Figure 1:
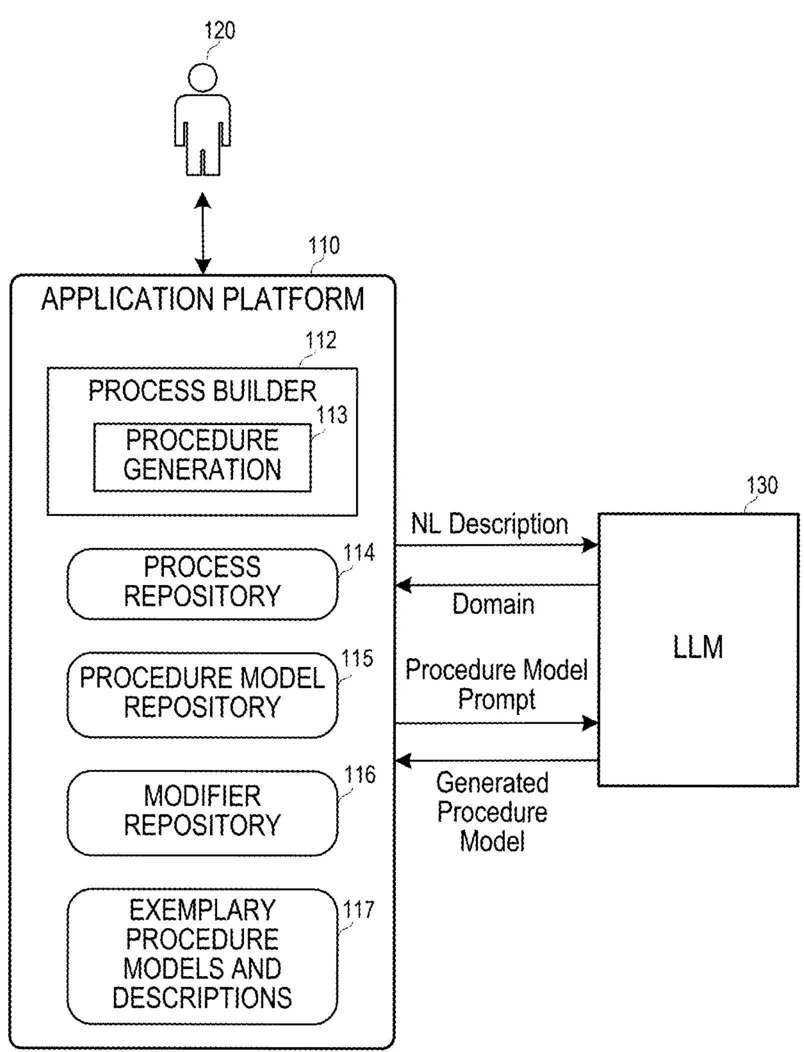
FIG. 1 is a block diagram of a system to generate executable procedures based on natural language inputs according to some embodiments.

FIG. 1 is a block diagram of a system to generate executable procedures based on natural language inputs according to some embodiments. Each of the illustrated components may be implemented using any suitable combination of computing hardware and/or software that is or becomes known. Such combinations may include cloud-based implementations in which computing resources are virtualized and allocated elastically. In some embodiments, two or more components are implemented by a single computing device or virtual machine.

More particularly, embodiments may be on-premise, cloud-based, distributed (e.g., with distributed storage and/or compute nodes) and/or deployed in any other suitable manner. Each computing system described herein may comprise disparate cloud-based services, a single computer server, a cluster of servers, and any other combination that is or becomes known. All or a part of each system may utilize Infrastructure-as-a-Service (IaaS), Platform-as-a-Service (PaaS) and/or Software-as-a-Service (SaaS) offerings owned and managed by one or more different entities as is known in the art.

Application platform 110 may comprise hardware and software to provide a runtime environment for execution of applications such as but not limited to process builder 112. The runtime environment may include an operating system, services, I/O, storage, libraries, frameworks, etc. to applications executing therein. Application platform 110 may comprise a standalone computing device, such as a personal computer or a smartphone, but embodiments are not limited thereto.

Application platform 110 may be cloud-based according to some embodiments. For example, process builder 112 may be accessed over the Web via a client application executed by a local computing system (not shown) of user 120. The client application may comprise a Web browser, a Java application executing within a virtual machine of a Web browser and/or any other suitable type of client application.

Process builder 112 may comprise program code executable by application platform 110 to generate automated workflows, herein described as processes. As is known in the art, process builder 112 may provide a user interface which allows user 120 to specify a sequence of activities, one or more applications to perform each activity, and data to be used during various activities. In one non-exhaustive example, a process may be designed to read perform optical character recognition on an invoice, read data from particular fields of the invoice, persist the data in a database, create an invoice approval document, populate the invoice approval document with some of the data, determine an approval contact based on some of the data and on an organization spreadsheet, create an e-mail to the approval contact, attach the invoice approval document to the e-mail, include an approval link to the e-mail, and send the e-mail. The process may be triggered in response to receipt of an invoice, and another process may be designed which is triggered in response to selection of the included link.

Such processes may be stored in process repository 114. Application platform 110 may include additional components for execution of the processes. As is known in the art, execution of a process may include the use of agents executing on remote systems to orchestrate performance of one or more activities of a process.

A procedure is a type of activity, and a process may include zero or more procedures. A procedure defines decision logic (e.g., if-then logic, rules) to be executed during execution of the process. With respect to the above example, a procedure may include a determination of whether an invoice was received from a particular type of supplier and for less than a threshold amount, and, if so, may mark the invoice as approved without sending an e-mail to an approval contact.

Procedure model repository 115 stores procedure models according to some embodiments. As noted above, procedure models are executable to cause performance of a procedure and define rules on which decisions of the procedure are based. The procedure models stored in procedure model repository 115 may be generated as described herein and via conventional means. A procedure model of procedure model repository 115 may be used within one or more processes of process repository 114.

Process builder 112 includes procedure generation component 113 according to some embodiments. Component 113 comprises program code which is executable to facilitate generation of an executable procedure (i.e., a procedure model) using natural language input.

In some embodiments, procedure generation component 113 provides a user interface through which a natural language description of a procedure is received from user 120. The natural language description is used to query LLM 130 for a domain of the procedure. LLM 130 may expose an API which is used to provide the query. LLM 130 may be publicly available or deployed within a landscape which is trusted by application platform 110. LLM 130 may comprise GPT, Aleph Alpha, or the like, but embodiments are not limited thereto.

The domain is received from LLM 130. The domain may comprise, but is not limited to, a field (e.g., finance, logistics, manufacturing) and an industry (e.g., aerospace, retail, banking). Procedure generation component 113 determines one or more modifiers for adding to the description based on the domain and on data stored within modifier repository 116. A modifier may comprise any suitable text. The data stored within modifier repository 116 may include, for example, for each of various domains, associated vocabulary, facts, terms and rules (e.g., Semantic Business Vocabulary and Rules-SBVR).

Procedure generation component 113 also determines examples of procedure models and corresponding natural language descriptions based on the domain and on exemplary procedure models and descriptions 117. Exemplary procedure models and descriptions 117 may include one or more natural language descriptions for each of several domains and, for each description, an exemplary procedure model which implements the decisions described by the description. Component 113 then builds a procedure model prompt based on the received natural language description, the modifiers and the examples.

LLM 130 is then queried with the procedure model prompt. This second query may include the procedure model prompt and the prior query/response, i.e., the historical conversation, as is known in the art. The length of the conversation may be reduced if needed as will be described below.

A procedure model is generated and returned in response to the second query. Component 113 checks the generated procedure model for validity based on expected characteristics of the generated procedure model. If it is not valid, component 113 may request a remainder of the generated procedure model from LLM 130. If it is valid, the generated procedure model is stored in procedure model repository 115. According to some embodiments, the generated procedure model received from LLM 130 is in a first format and is converted to a second format prior to storage in procedure model repository 115.

Figure 2:
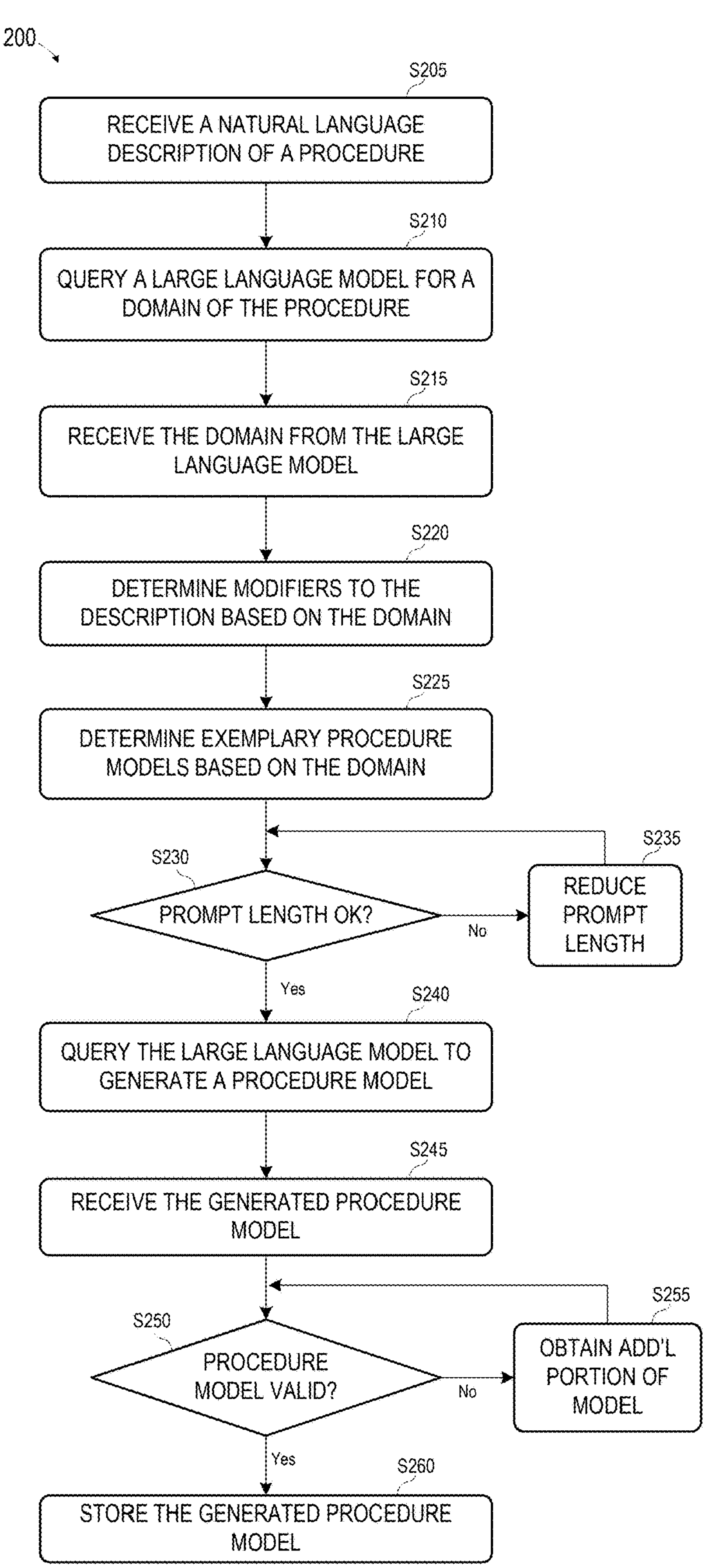
FIG. 2 is a flow diagram of a process to generate an executable procedure based on natural language inputs according to some embodiments.

FIG. 2 is a flow diagram of process 200 to generate a procedure model based on a natural language description according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a microprocessor thread. Embodiments are not limited to the examples described below.

Initially, a natural language description of a procedure is received at S205. The natural language description may include a description of conditional logic in plain (i.e., non-technical, non-programming code) language. The natural language description may be received via a user interface of an automated workflow builder application such as but not limited to process builder 112.

Figure 3:
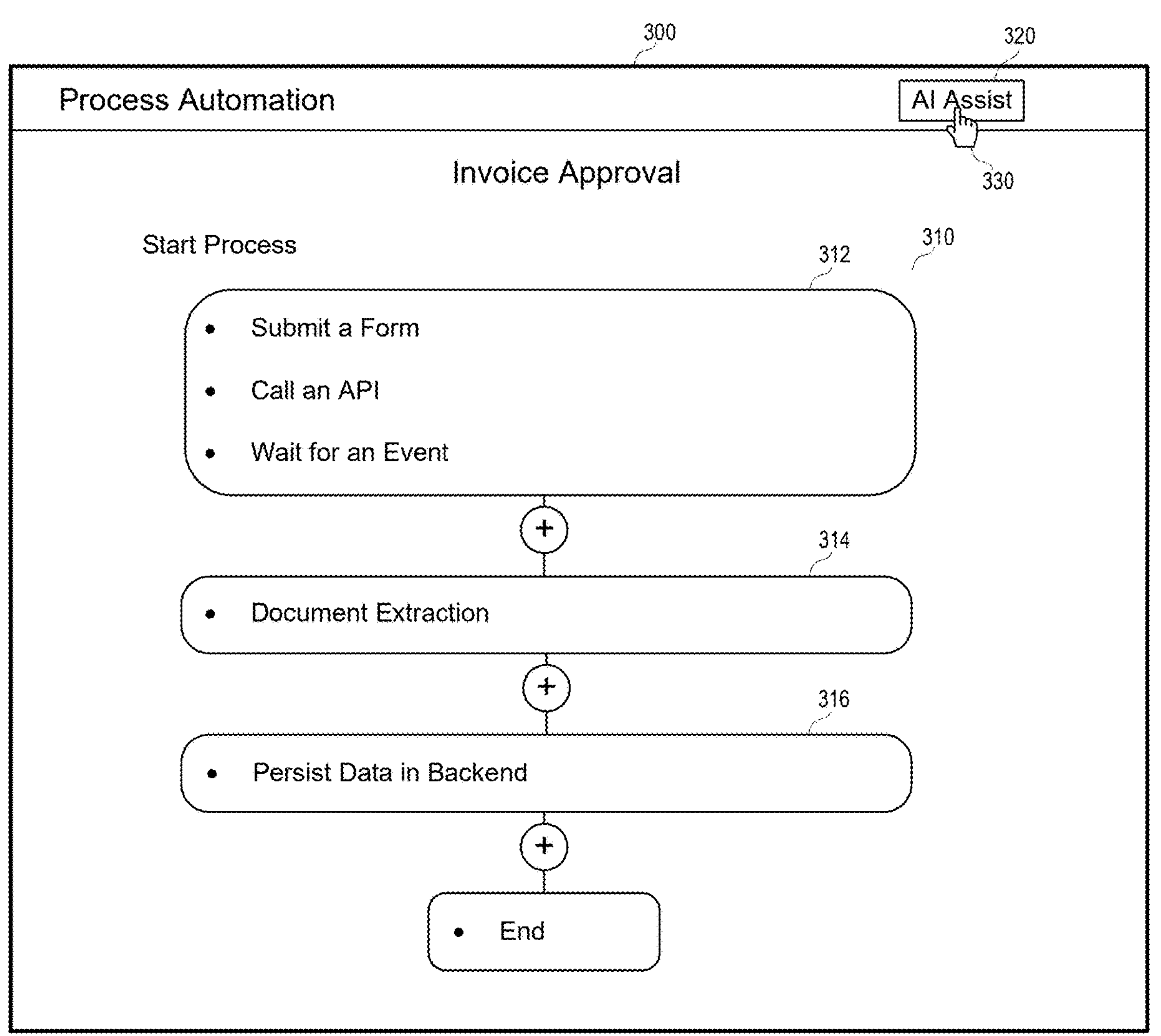
FIG. 3 is a view of an interface of an automated workflow system according to some embodiments.

FIG. 3 illustrates interface 300 of an automated workflow builder application according to some embodiments. In one example, a user accesses an application to generate an automated process and the application returns an interface such as interface 300. According to some embodiments, interface 300 is presented by a device executing a client application (e.g., a Web application) which communicates with a process builder service provided by a cloud-based system.

Interface 300 presents Invoice Approval process 310. Process 310 thus far includes activities 312, 314 and 316, which may be defined by a user operating interface 300 as is known in the art. Interface 300 includes AI assist control 320, which is shown being selected by cursor 330. It should be noted that interface 300 may implement any user interface metaphors that are or become known to provide the functions described herein.

Figure 4:
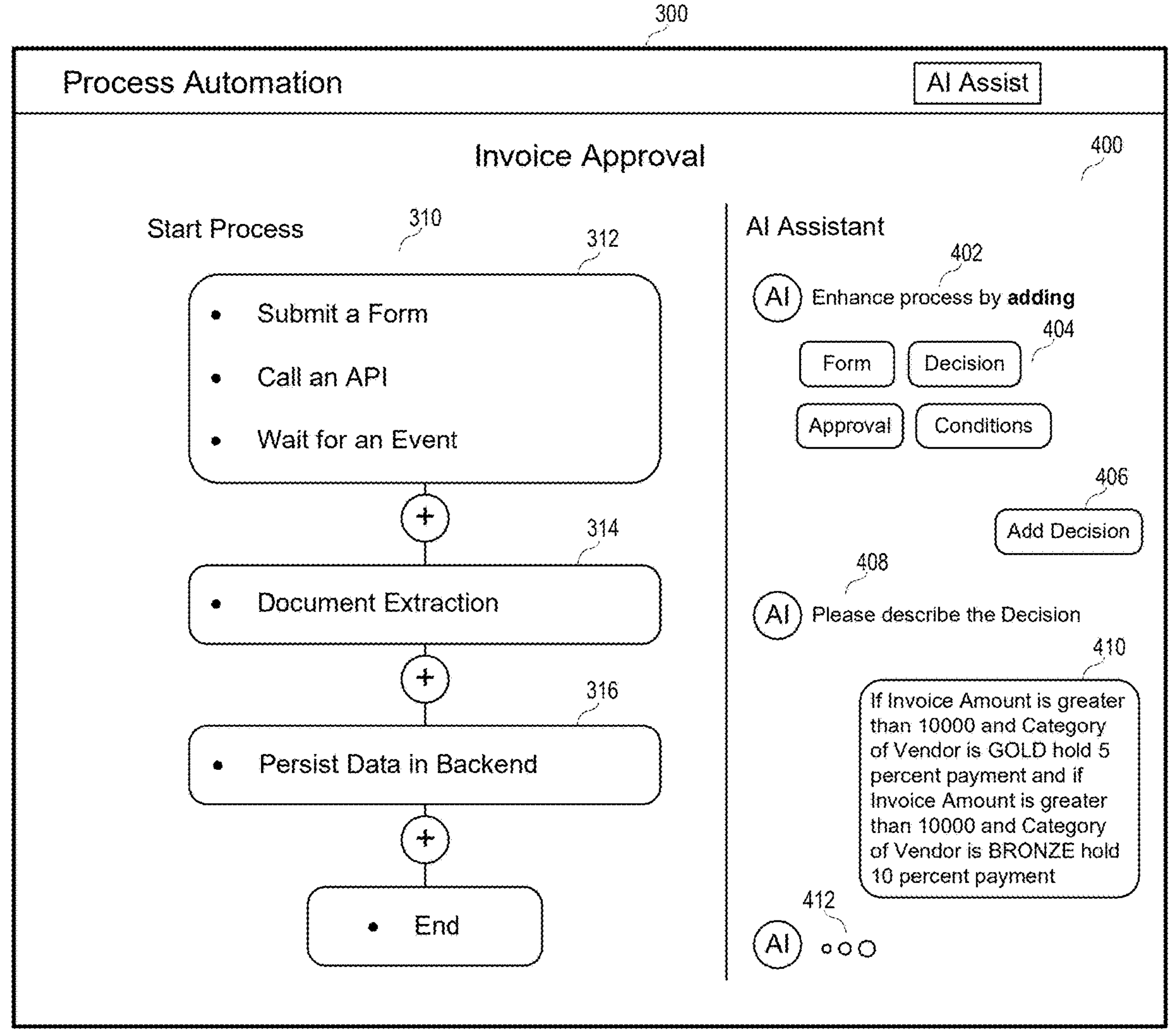
FIG. 4 is a view of an interface of an automated workflow system using natural language inputs to generate an executable procedure according to some embodiments.

Selection of control 320 results in display of chat interface 400 as shown in FIG. 4. Chat interface 400 may be controlled by a component providing natural language-based functionality such as procedure generation component 113 of process builder 112. According to the illustrated example, the component presents text 402 and selection controls 404. It is assumed that the user selects Decision control 404 in order to add a procedure including a rule-based decision to process 300. The selection is confirmed by text 406 and request 408 is presented.

The user then inputs natural language description 410 into chat interface 400. Description 410 may be input via a keyboard, voice, or any other combination of input modalities. As shown, description 410 of the present example exhibits an IF/THEN AND IF/THEN logical structure. Natural language descriptions according to some embodiments are not limited to any particular logical structure.

Processing indicators 412 represent the execution of background processing in order to provide a response to the input of natural language description 410. Such background processing may include S210 through S245 of process 200.

In some embodiments, and prior to S210, the received description is checked for "sensitive" text. Such text may include, but is not limited to, Personally Identifiable Information, secret data, privileged data, hate speech, and bias language. The check may utilize an existing external or internal library. Identified sensitive text may be removed from the description prior to proceeding. In some embodiments, the user is notified of the sensitive text and asked to provide a revised description which does not include such text. The revised description will also be checked for sensitive text as described above.

At S210, a query is sent to an LLM for a domain of the procedure based on the natural language description. The query may include the text of the natural language description and additional text such as "what is the domain of this description?". The query sent at S210 may include multiple queries in the case of N-shot training in which examples of descriptions and corresponding domains are first provided to the LLM. The domain is received from the LLM at S215.

Next, some embodiments check the length of the current conversation with the LLM. For example, it may be determined whether the total history of the conversation (which may include multiple queries and responses) exceeds an input token restriction of the LLM used. If so, the length may be reduced by truncating older text of the conversation (e.g., truncate all but the last ten prompts and responses). Additionally, or alternatively, the conversation is provided to the LLM (or to another LLM having a larger input token restriction) along with a request to summarize the conversation. Moving forward, the returned summary is then used as the historical conversation.

Modifiers to the description are determined at S220 based on the domain. For example, the modifiers may be determined from a repository of modifiers related to various domains. The modifiers may include, for each domain, associated vocabulary, facts, terms and rules. The modifiers determined at S220 are added to the query sent at S210.

Examples of a procedure model are determined at S225. The examples may be determined based on the domain from a repository of examples associated with various domains. The examples may include, for each domain, one or more natural language descriptions and procedure models associated with each of the descriptions. The determined examples are added to the description and modifiers to generate a procedure model prompt at S225.

The length of the procedure model prompt and, if used, the historical conversation, is checked against an input token restriction at S230. If the length exceeds the restriction, the length of the procedure model prompt/historical conversation is reduced at S235. Techniques employed at S235 may include splitting the procedure model prompt/historical conversation and individually providing the parts thereof to the LLM if the LLM is capable of supporting such splitting. In another example, the historical conversation may be provided at S235 to the LLM, or to another LLM having a larger input token restriction, along with a request to summarize the historical conversation.

Once the length of the procedure model prompt/historical conversation is satisfactory, the procedure model prompt/historical conversation is used at S240 to query the LLM to generate a procedure model. The generated procedure model is received and checked for validity at S250. The validity check may comprise verification that the generated procedure model conforms to expected syntax and/or other characteristics. If it is determined that the generated procedure model is not valid, a remainder of the generated procedure model is requested from the LLM at S255. Flow may cycle several times between S250 and S255 until a valid procedure model is received.

Figure 5:
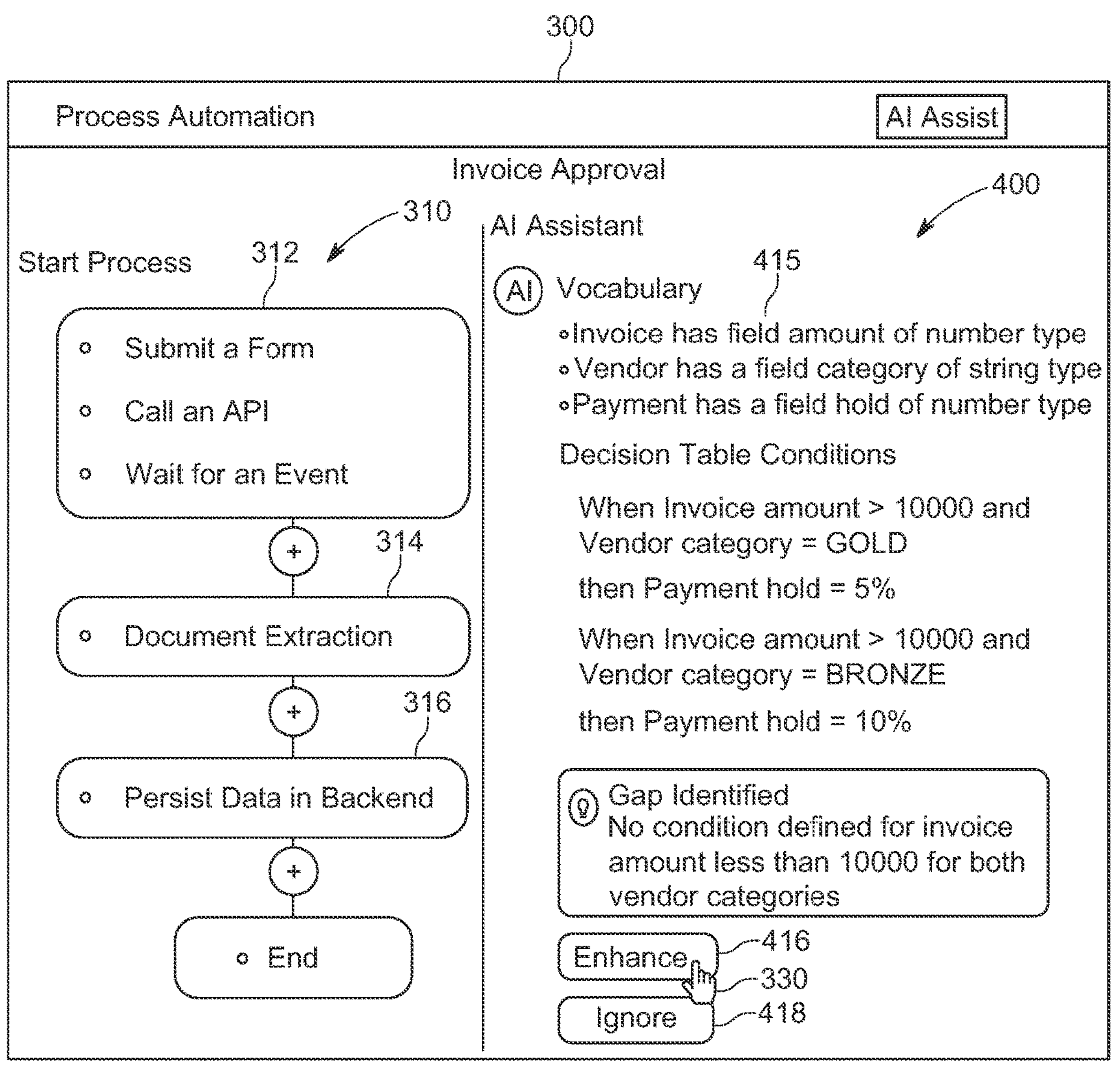
FIG. 5 is a view of an interface of an automated workflow system using natural language inputs to generate an executable procedure according to some embodiments.

FIG. 5 illustrates chat interface 400 after reception of a valid generated procedure model in some embodiments. Text 415 is intended to present the relevant entities of the generated procedure model in an easy-to-understand format. Specifically, the Vocabulary portion text 415 identifies logical entities of the domain and fields of those entities which were determined to be relevant to the received natural language description. The Decision Table Conditions portion of text 415 specifies IF/THEN logic using the relevant fields.

According to some embodiments, the LLM returns, in addition to the generated procedure model, an indication of logical gaps in the generated procedure model. The gaps may be described as shown along with text 415. Control 416 may be selected to enhance the generated procedure model so as to address the logical gaps, while control 418 may be selected to ignore the gaps and proceed with the current generated procedure model.

Figure 6:
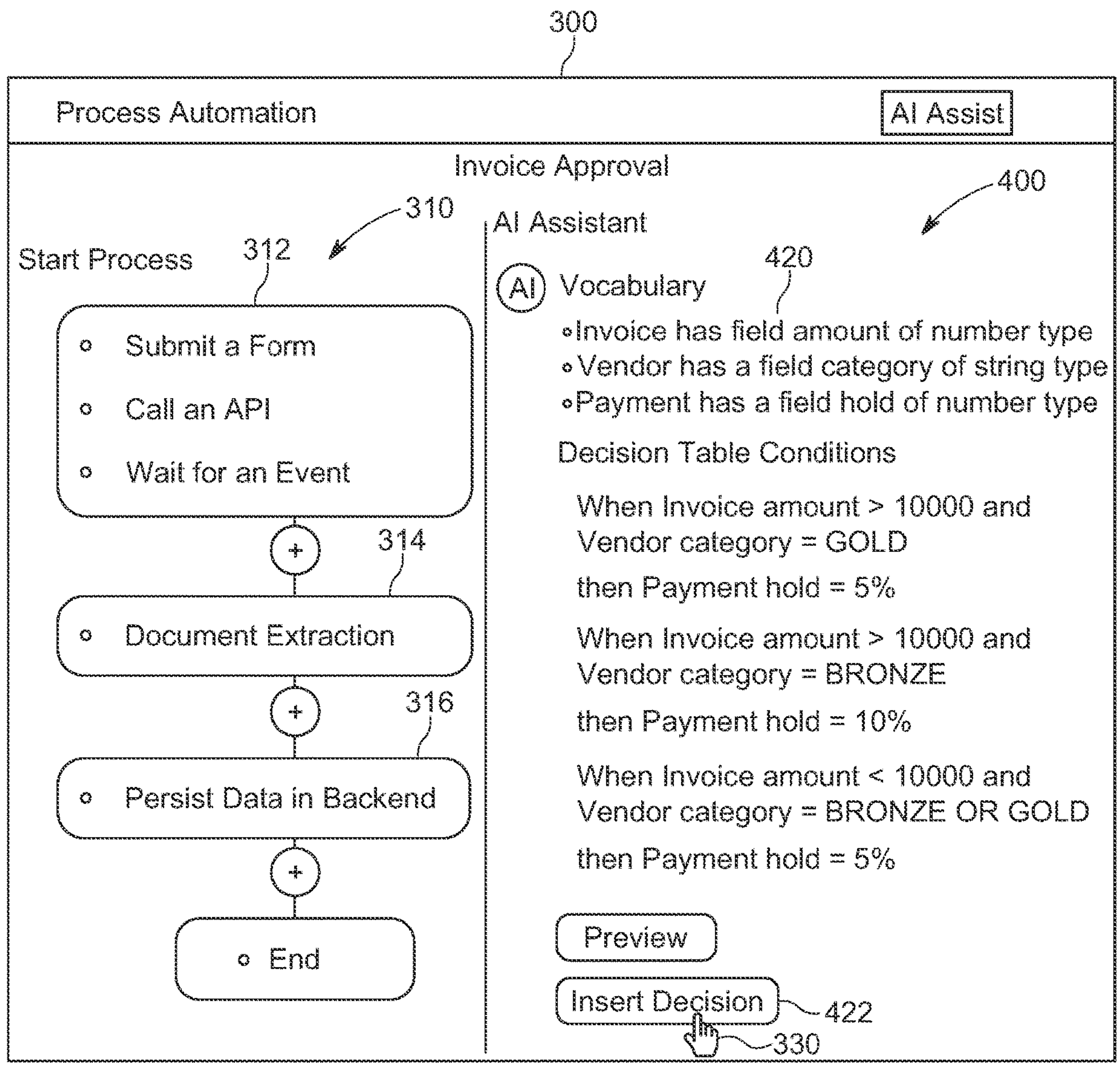
FIG. 6 is a view of an interface of an automated workflow system using natural language inputs to generate an executable procedure according to some embodiments.

In the present example, cursor 330 selects control 416 and the generated procedure model is updated in response. FIG. 6 shows text 420 describing an updated procedure model. In particular, the Decision Table Conditions portion of text 420 specifies additional IF/THEN logic to address situations in which the invoice amount is less than 10000 and the vendor category is Bronze or Gold. Cursor 330 then selects control 422 to insert the generated procedure model into process 310.

Figure 7:
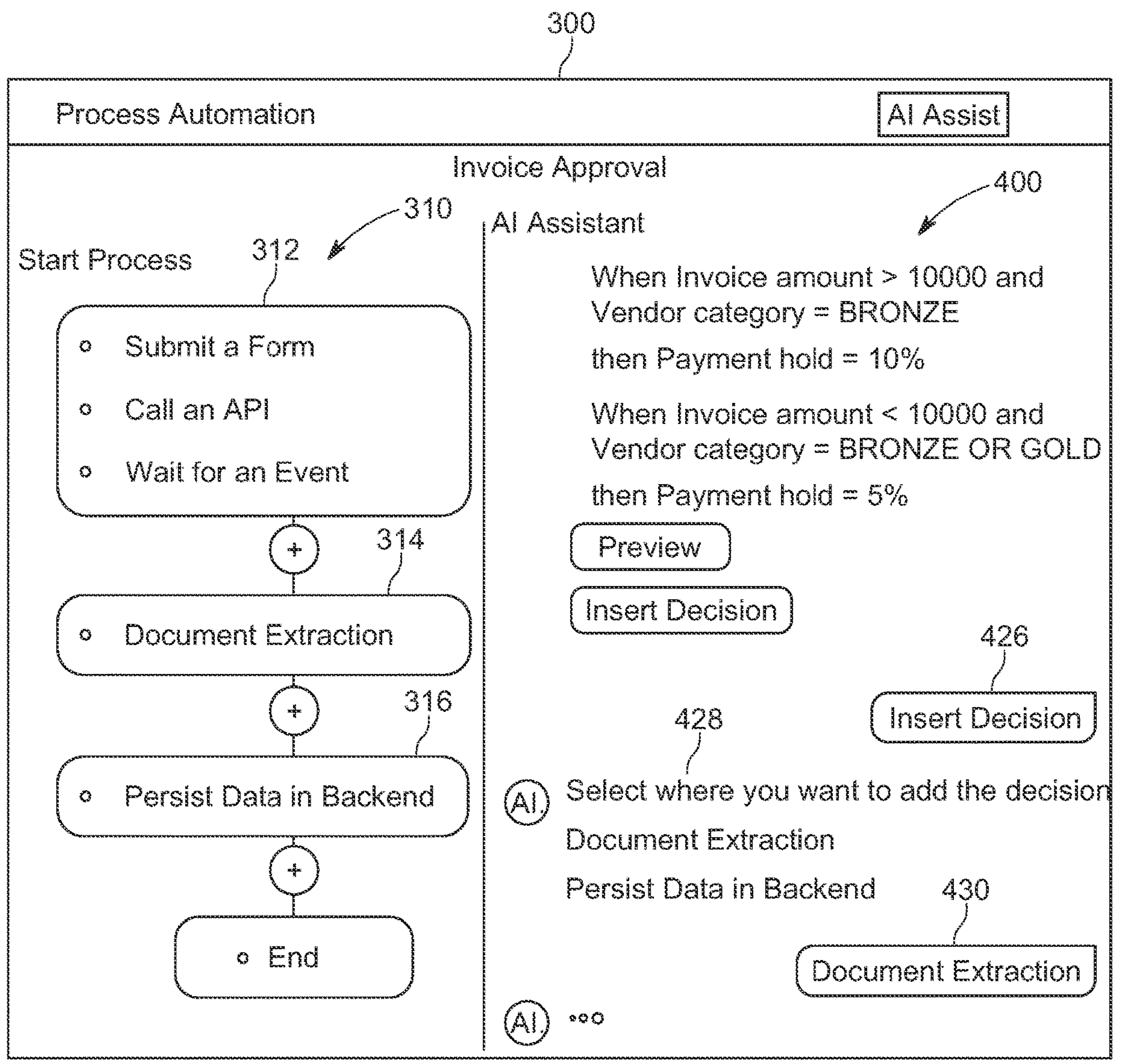
FIG. 7 is a view of an interface of an automated workflow system using natural language inputs to generate an executable procedure according to some embodiments.
Figure 8:
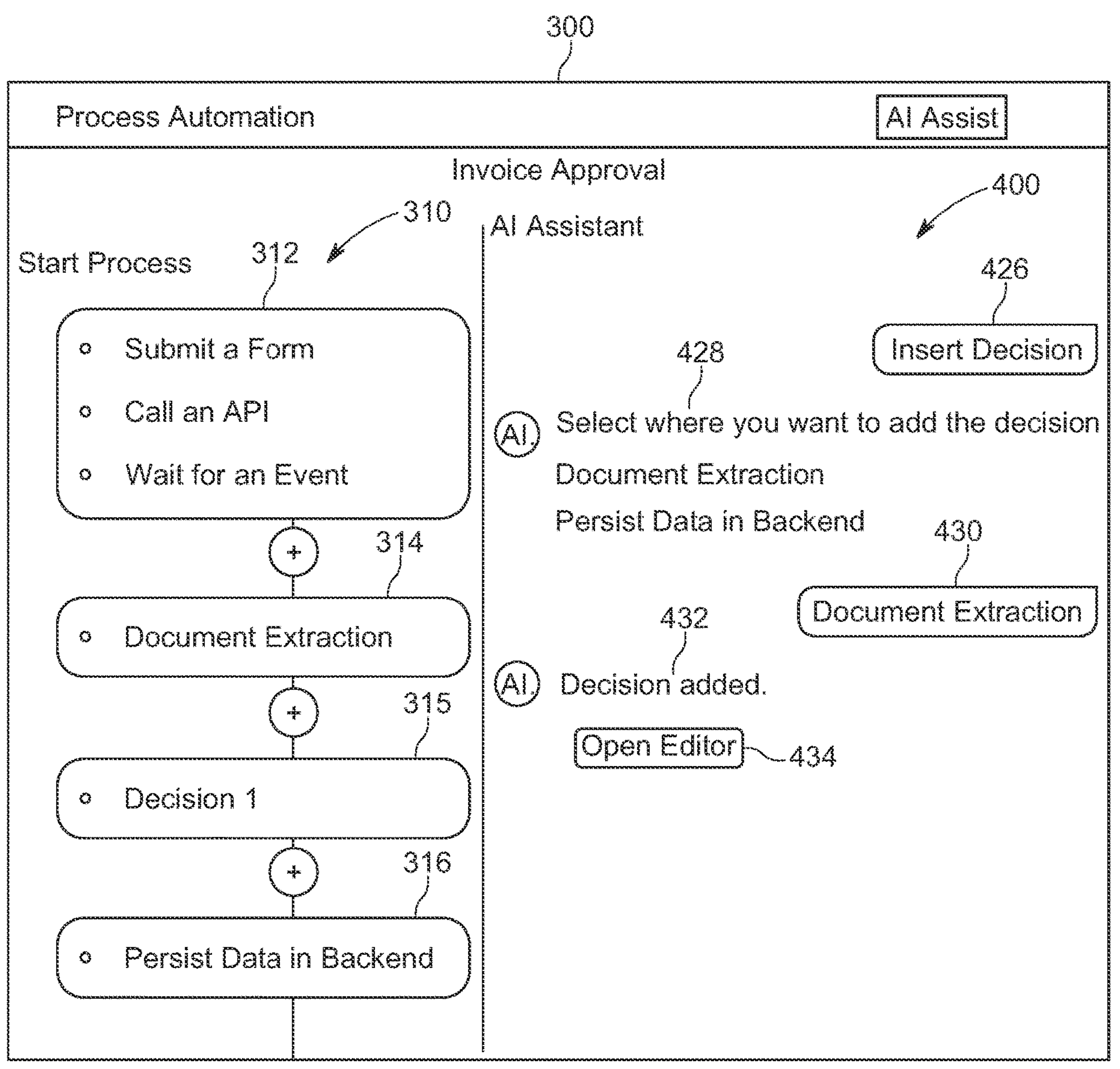
FIG. 8 is a view of an interface of an automated workflow system using natural language inputs to generate an executable procedure according to some embodiments.

As shown in FIG. 7, selection of control 422 results in display of confirmation text 426 and query 428. It will be assumed that the user selects Document Extraction in query 428, resulting in display of confirmation text 430. FIG. 8 shows addition of the generated procedure model as activity 315 of process 310. Text 432 is presented in chat interface 400 to confirm the addition.

Figure 9:
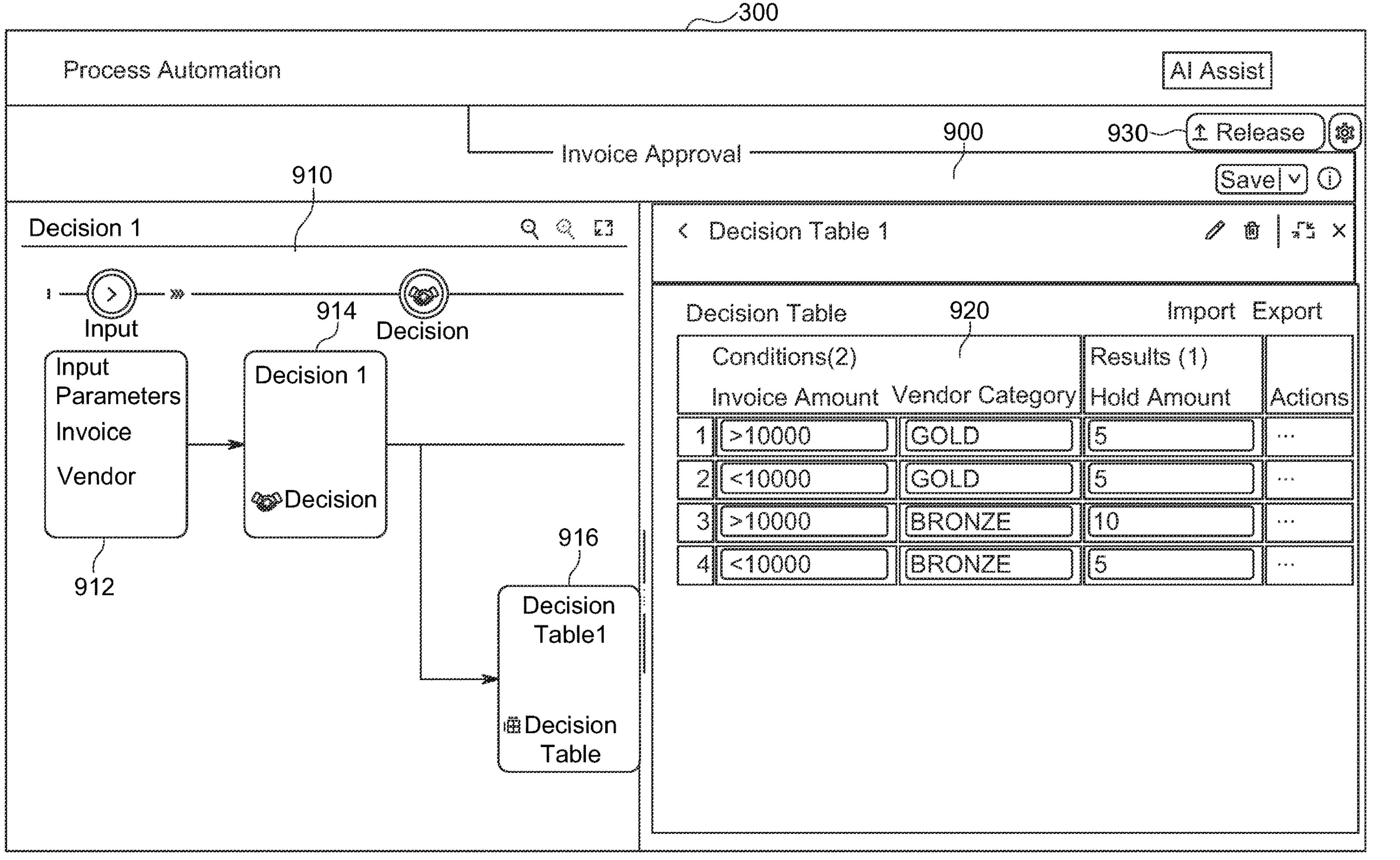
FIG. 9 is a view of an interface to view and edit a procedure model generated according to some embodiments.

In the present example, chat interface also presents control 434 for opening a procedure model editor. FIG. 9 shows interface 900 of such an editor after selection of control 434. Interface 900 includes diagram 910 of the generated procedure model, which in turn includes entities 912, 914 and 916 representing, respectively, input parameters of the procedure, a decision of the procedure, and a decision table specifying rules on which the decision is to be based.

Entity 916 of diagram 910 is selected, resulting in display of decision table 920. A user may edit either diagram 910 or decision table 920 via interface 900. Such editing results in changes to the underlying procedure model.

Interface 900 also includes Release control 930, which is selectable to cause storage of the generated procedure model at S260 of process 200. Release may include various pre-approval processes as is known in the art. For example, an approval task may be assigned to an administrator to verify the generated procedure model. The administrator may be able to view the original natural language description, the Vocabulary and Decision Table Conditions, and the actual procedure model, and to simulate/test the model.

Release of the procedure model may also include conversion of the generated procedure model from a first format to a second format. The first format may be DMN as described above. The DMN-formatted procedure model may initially be converted from .xml format into Java objects. A procedure model of a second format may then be generated from the Java objects. According to some embodiments, the second format is a standardized meta model for the definition and exchange of rules regardless of stack or execution language. The standardized meta model may be, for example, a proprietary standardized meta model (e.g., an SAP proprietary standardized meta model).

The Java objects may be mapped to entities of the second format. For example, the DMN item definitions may be mapped to data objects, the DMN decision table may be mapped to decision table rules, and the DMN decision may be mapped to a rule service. The input and output expressions of each rule are converted to a suitable expression language. In some embodiments, thusly-converted expressions are converted to abstract syntax trees (ASTs) and persisted. The entities of the second format may then be serialized to JavaScript Object Notation (JSON) and persisted to a new or existing project of a rule repository using APIs. Finally, the serialized entities are validated and activated.

Figure 10:
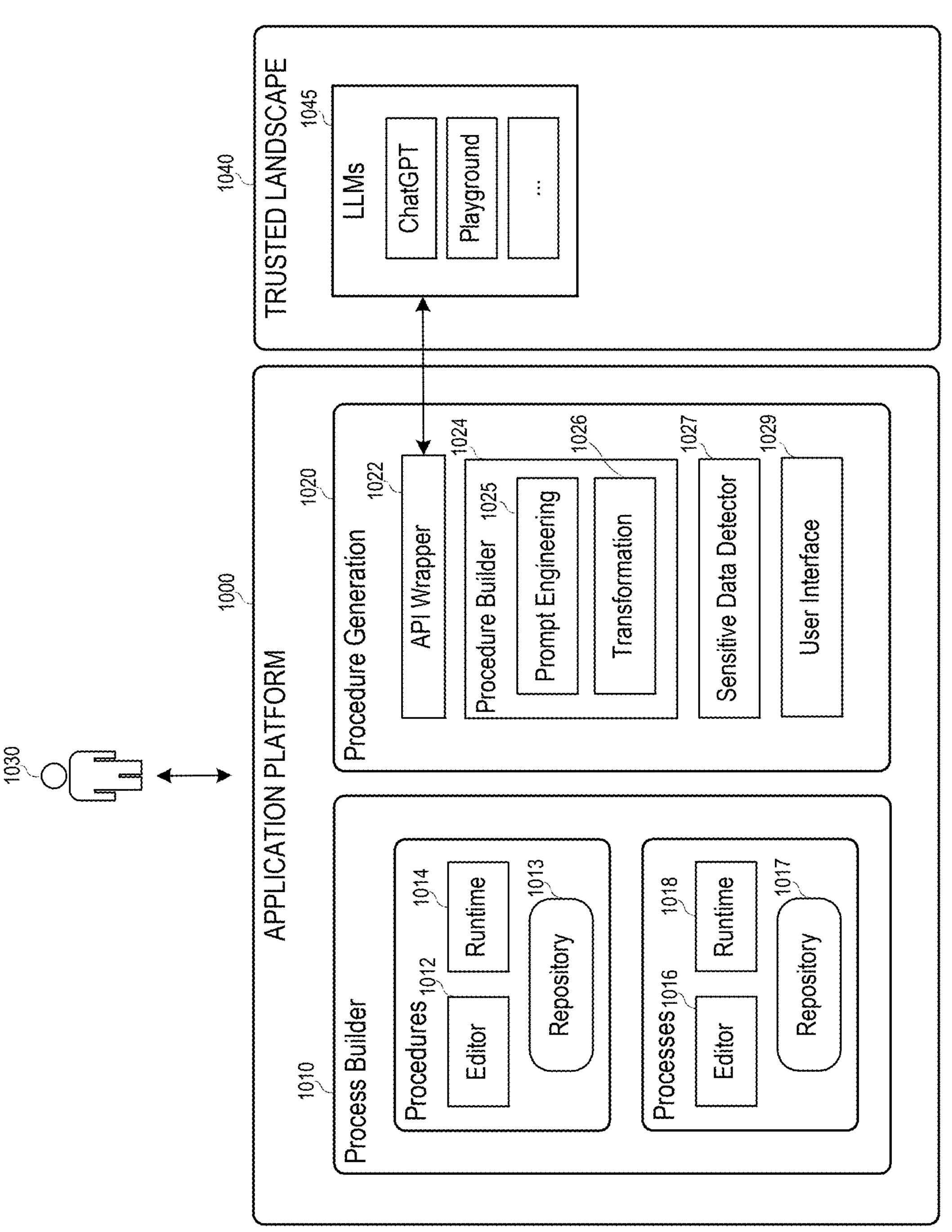
FIG. 10 is a block diagram of a system to generate executable procedures based on natural language inputs according to some embodiments.

FIG. 10 is a block diagram of a system to generate executable procedure models based on natural language inputs according to some embodiments. Application platform 1000 includes process builder component 1010 as described above. Component 1010 includes editor 1012, repository 1013 and runtime 1014 to edit, store and execute procedure models as well as editor 1016, repository 1017 and runtime 1018 to edit, store and execute processes.

Procedure generation component 1020 may implement process 200 to generate executable procedure models based on natural language descriptions received from user 1030. Procedure generation component 1020 includes API wrapper 1022, procedure builder 1024, sensitive data detector 1027 and user interface component 1029.

API wrapper 1022 may be responsible for all inbound and outbound communications to and from procedure generation component 1020. API wrapper 1022 may provide a simple static interface to procedure builder 1024 to communicate with any LLMs which may be utilized. For example, trusted landscape 1040 provides two or more LLMs 1045 with which API wrapper 1022 may communicate. One LLM 1045 may be associated with a larger input token restriction and used to summarize prompts for submission to another LLM 1045 as described above.

Procedure builder 1024 includes prompt engineering component 1025 to generate queries to LLM 1045 as described herein and transformation component 1026 to transform a generated procedure model from a first format to a second format. Sensitive data detector 1027 identifies sensitive text in the procedure description received from user 120. Sensitive data detector 1027 may comprise an open source, in-house or licensed tool. User interface component 1029 could conform to any UI framework or chatbot architecture to provide user interaction such as that described with respect to FIGS. 4-8.

Figure 11:
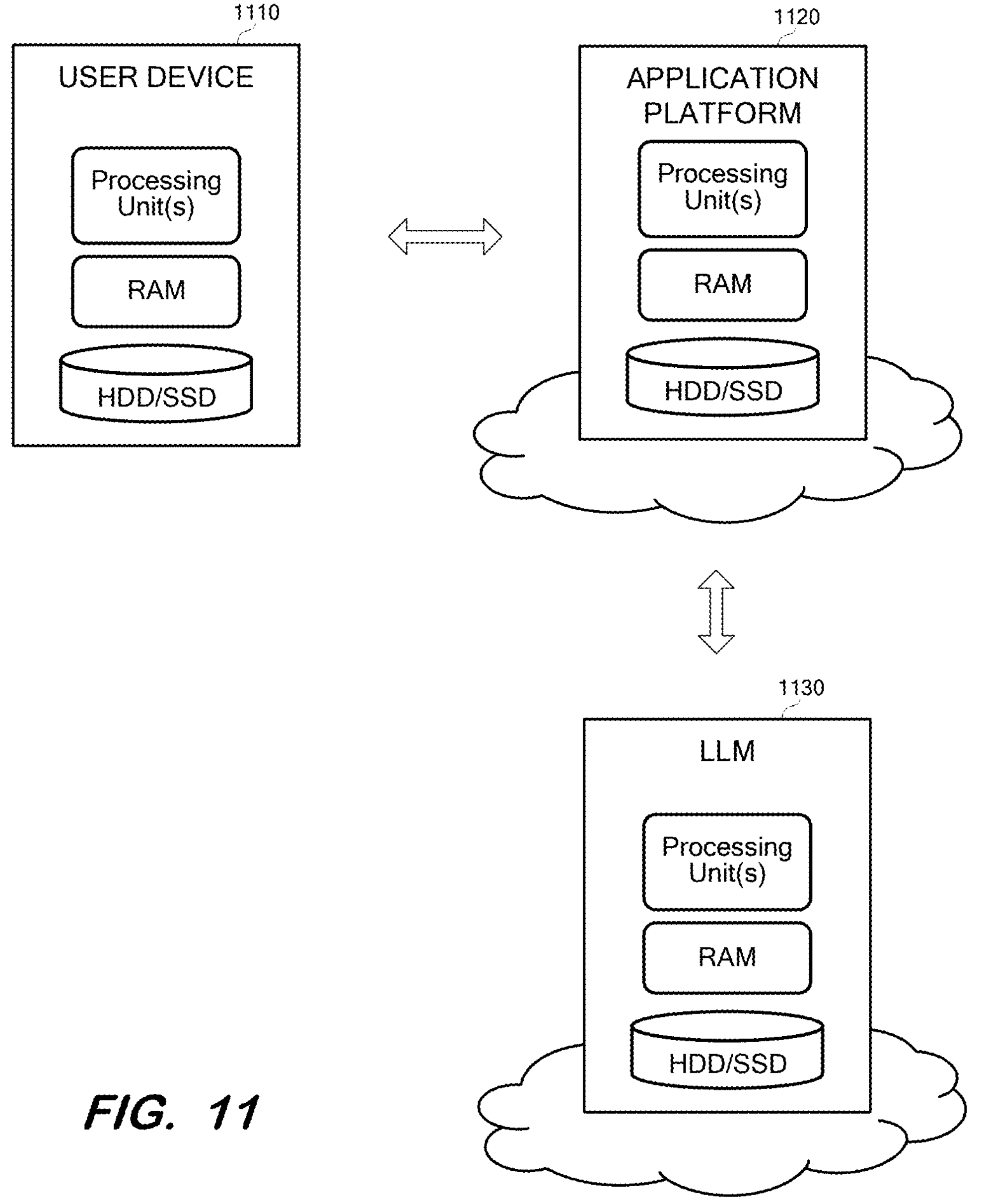
FIG. 11 is a block diagram of a cloud-based system to generate executable procedures based on natural language inputs according to some embodiments.

FIG. 11 is a block diagram of a cloud-based system according to some embodiments. In this regard, application platform 1120 and LLM 1130 may comprise cloud-based compute resources, such as virtual machines, allocated by a public cloud provider providing self-service and immediate provisioning, autoscaling, security, compliance and identity management features.

User device 1110 may interact with user interfaces of a process builder application executing on application platform 1120, for example via a Web browser executing on user device 1110. The application may receive a natural language description of a procedure and communicate with LLM 1130 to generate an executable procedure model as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:

a memory storing executable program code; and at least one processing unit to execute the program code to cause the system to:

receive a natural language description of a procedure;

determine a domain of the natural language description using a large language model;

determine modifiers to the description based on the domain; determine examples including procedure models and natural language descriptions corresponding to the procedure models based on the domain;

generate a procedure model prompt based on the natural language description, the modifiers and the examples;

provide the procedure model prompt to the large language model;

in response to the procedure model prompt, receive a generated procedure model and an indication of a logical gap from the large language model;

receive an instruction to enhance the generated procedure model to address the logical gap;

in response to the instruction, generate an updated procedure model; and store the updated procedure model for execution by a workflow automation system.

2. A system according to claim 1, wherein generation of the procedure model prompt comprises:

determination that a length of the procedure model prompt and a corresponding historical conversation exceeds a token restriction associated with the large language model; and in response to the determination that the length of the procedure model prompt and the corresponding historical conversation exceeds the token restriction, request a summary of the historical conversation from the large language model.

3. A system according to claim 2, the at least one processing unit to execute the program code to cause the system to:

determine that the generated procedure model does not conform to a first procedure model format; and in response to the determination that the generated procedure model does not conform to the first procedure model format, request a remainder of the generated procedure model from the large language model.

4. A system according to claim 3, the at least one processing unit to execute the program code to cause the system to:

convert the updated procedure model to a plurality of JAVA objects.

5. A system according to claim 4, the at least one processing unit to execute the program code to cause the system to:

convert the plurality of JAVA objects to a second procedure model conforming to a second procedure model format.

6. A system according to claim 1, the at least one processing unit to execute the program code to cause the system to:

determine that the generated procedure model does not conform to a first procedure model format; and in response to the determination that the generated procedure model does not conform to the first procedure model format, request a remainder of the generated procedure model from the large language model.

7. A system according to claim 1, wherein the updated procedure model conforms to a first procedure model format, and the at least one processing unit to execute the program code to cause the system to:

convert the updated procedure model to a plurality of JAVA objects; and convert the plurality of JAVA objects to a second procedure model conforming to a second procedure model format.

8. A method comprising:

receiving a description of a procedure;

inputting the description to a large language model to determine a domain of the description;

determining modifiers to the description based on the domain;

determining example procedure models and descriptions corresponding to the example procedure models based on the domain;

generating a procedure model prompt based on the description, the modifiers, the example procedure models and corresponding descriptions;

providing the procedure model prompt to the large language model;

in response to the procedure model prompt, receiving a generated procedure model and an indication of a logical gap from the large language model;

receiving an instruction to enhance the generated procedure model to address the logical gap;

in response to the instruction, generating an updated procedure model; and storing the updated procedure model for execution by a workflow automation system.

9. A method according to claim 8, wherein generating the procedure model prompt comprises:

determining that a length of the procedure model prompt and a corresponding historical conversation exceeds a token restriction associated with the large language model; and in response to determining that the length of the procedure model prompt and the corresponding historical conversation exceeds the token restriction, requesting a summary of the historical conversation from the large language model.

10. A method according to claim 9, further comprising:

determining that the generated procedure model does not conform to a first procedure model format; and in response to determining that the generated procedure model does not conform to the first procedure model format, requesting a remainder of the generated procedure model from the large language model.

11. A method according to claim 10, further comprising:

converting the updated procedure model to a plurality of JAVA objects.

12. A method according to claim 11, further comprising:

converting the plurality of JAVA objects to a second procedure model conforming to a second procedure model format.

13. A method according to claim 8, further comprising:

determining that the generated procedure model does not conform to a first procedure model format; and in response to determining that the generated procedure model does not conform to the first procedure model format, requesting a remainder of the generated procedure model from the large language model.

14. A method according to claim 8, wherein the updated procedure model conforms to a first procedure model format, the method further comprising:

converting the updated procedure model to a plurality of JAVA objects; and converting the plurality of JAVA objects to a second procedure model conforming to a second procedure model format.

15. A non-transitory medium storing program code executable by at least one processing unit of a computing system to cause the computing system to:

input a description of a procedure to a large language model to determine a domain of the description;

determine modifiers to the description based on the domain;

determine example procedure models and descriptions corresponding to the example procedure models based on the domain;

generate a procedure model prompt based on the description, the modifiers, the example procedure models and corresponding descriptions;

determine that a length of the procedure model prompt and a corresponding historical conversation exceeds a token restriction associated with the large language model;

in response to determination that the length of the procedure model prompt and the corresponding historical conversation exceeds the token restriction, request a summary of the historical conversation from the large language model;

provide the procedure model prompt and the summary of the historical conversation to the large language model;

in response to the procedure model prompt and the summary of the historical conversation, receive a generated procedure model from the large language model; and store the generated procedure model for execution by a workflow automation system.

16. A medium according to claim 15, the program code executable by at least one processing unit of a computing system to cause the computing system to:

determine that the generated procedure model does not conform to a first procedure model format; and in response to determination that the generated procedure model does not conform to the first procedure model format, request a remainder of the generated procedure model from the large language model.

17. A medium according to claim 16, the program code executable by at least one processing unit of a computing system to cause the computing system to:

convert the updated procedure model to a plurality of JAVA objects.

18. A medium according to claim 17, the program code executable by at least one processing unit of a computing system to cause the computing system to:

convert the plurality of JAVA objects to a second procedure model conforming to a second procedure model format.

19. A medium according to claim 15, the program code executable by at least one processing unit of a computing system to cause the computing system to:

determine that the generated procedure model does not conform to a first procedure model format; and in response to determination that the generated procedure model does not conform to the first procedure model format, request a remainder of the generated procedure model from the large language model.

* * * * *